United States Patent [19]

Schiel et al.

[11] Patent Number: 4,979,426
[45] Date of Patent: Dec. 25, 1990

[54] VACUUM BRAKE POWER BOOSTER

[75] Inventors: Lothar Schiel, Hofheim; Vincenzo Cappucci, Frankfurt am Main, both of Fed. Rep. of Germany

[73] Assignee: Alfred Teves GmbH, Frankfurt Am Main, Fed. Rep. of Germany

[21] Appl. No.: 425,616

[22] Filed: Oct. 23, 1989

[30] Foreign Application Priority Data

Nov. 17, 1988 [DE] Fed. Rep. of Germany ....... 3838848

[51] Int. Cl.⁵ .......................... B60T 8/44; B60T 13/00; F01B 19/00
[52] U.S. Cl. ..................................... 91/369.1; 91/521; 91/523; 92/48; 303/4; 303/114
[58] Field of Search .............. 92/48; 91/369.1, 376 R, 91/521, 523; 60/547.1; 303/4, 12, 110, 113, 114, 115, 119

[56] References Cited

U.S. PATENT DOCUMENTS

| | | | |
|---|---|---|---|
| 4,494,445 | 1/1985 | Furuta et al. | 92/49 X |
| 4,718,326 | 1/1988 | Sugiura et al. | 91/369.1 |
| 4,718,328 | 1/1988 | Mori et al. | 92/48 X |
| 4,882,980 | 11/1989 | Arino et al. | 92/48 |
| 4,932,727 | 6/1990 | Wagner et al. | 303/4 |

Primary Examiner—Allen M. Ostrager
Attorney, Agent, or Firm—Robert P. Seitter

[57] ABSTRACT

A vacuum brake power booster for a slip-controlled hydraulic brake unit in which a major reduction of the costs of manufacture and of mounting and simultaneously an increase of its reliability in operation is provided. A first movable wall (7) within the booster housing is movable independently of the brake pedal input member (11) and a second movable wall (15) is provided at the first control housing part (52).

16 Claims, 2 Drawing Sheets

VACUUM BRAKE POWER BOOSTER

BACKGROUND OF THE INVENTION

This invention relates to a vacuum brake power booster for a slip-controlled hydraulic brake unit, with at least two power chambers separated from each other by a first movable wall within a booster housing. One of the chambers being connectable either to a vacuum source or to the atmosphere and the other one, for the purpose of generating a boosting power which is proportional to an input power introduced at a brake pedal, being aeratable through a control valve which is actuatable by means of the brake pedal. The control valve housing comprises two control housing parts being slidable relative to each other. The first control housing part is abutted against a stationary stop and the second control housing part bearing the first movable wall, guiding a control valve piston which is connected to the brake pedal by means of an input member and interacting with a power output member. A second movable wall which is subjectable to a controllable differential pressure and which separates a first pneumatic power chamber connected to the vacuum source in the release position from a second pneumatic power chamber subjectable to the atmosphere and, respectively, to vacuum.

A vacuum brake power booster of this type is known from published German patent application No. P 38 14 222.8. The special feature of the known brake power booster is that in the event of slip control, the second movable wall is movable in a direction contrasting that of actuation of the master brake cylinder due to the effect of two compensating cylinders being associated to the pressure chambers of the master brake cylinder and in that a hydraulic chamber being in active connection with the power output member is provided whose link to a pressureless hydraulic fluid reservoir is cut off by means of a seat valve.

In the known arrangement, the sophisticated set-up, in particular the brake pressure modulator of the brake power booster being connected with considerable design effort, is disadvantageous. In addition, the risk that upon an extended pause of functioning, the components being operated in the event of the anti-locking or the traction slip control action can be damaged, for example, be fretting corrosion and may so become unserviceable also is a disadvantage.

It is, therefore, an object of the present invention to provide a brake power booster of the type mentioned in such a manner that both reliability in operation is increased and, at the same time, the costs of manufacture and of mounting involved are reduced to a considerable extent. Moreover, the master cylinder pistons and the brake pedal are to be completely restored upon each slip control action.

SUMMARY OF THE INVENTION

According to the present invention, these objects are achieved in that the first movable wall is movable independently of the input member and in that the second movable wall is provided at the first control housing part. Due to this arrangement, all control operations will be felt at the brake pedal.

In an advantageous embodiment of the present invention, the first movable wall is axially guided within a first cylindrical extension of a partition wall arranged within the booster housing and separating the second pneumatic power chamber from the power chamber which is aeratable by means of the control valve. The second cylindrical extension passes over to a second cylindrical extension having a smaller diameter within which the second control housing part is sealedly guided. Due to this provision, the risk of the power output member buckling out is largely eliminated. Simultaneously, the friction losses in the master brake cylinder succeeding the vacuum brake power booster are minimized.

In one embodiment, axially symmetrical configuration of the second control housing part, axially extending air guide ducts are provided in it which end in an annular chamber being defined by the second axial extension and in connection with the aeratable power chamber. Very favorable short response times are achieved by the large cross sections of the resulting air guidance. In order to avoid the risk of bulging out of the second movable wall, in a further embodiment of the present invention, the first control housing part is provided with a cylindrical guide which is guided on the first extension of the partition wall. An air flow being favorable for the functioning of the vacuum brake power booster according to the invention, the first cylindrical extension of the partition wall is furnished with axially extending radial fins being disposed both on the outside and on the inside. In another advantageous embodiment of the vacuum brake power booster according to the present invention, a clearly defined position of the brake pedal is achieved in that the first control housing part is formed with an annular surface which in the release position is abutted against a sealing ring sealing off the booster housing toward the outside.

In order in the event of an anti-locking control action to effectively to counteract the input power, the second movable wall is in power transmitting connection with the input member. The power transmitting connection is formed by a stepped cylindrical bushing which is in a friction-type locking with the first control housing part and at which a compression spring takes support whose other end is abutted against a disc being secured to the input member. In this context, the response times of the vacuum brake power booster can be reduced further in that the disc is furnished with axial openings.

In order to allow to carry out traction slip control procedure, the first pneumatic power chamber is connectable to the atmosphere and means are provided which transmit the power enacted by the second movable wall to the second control housing part. This means preferably is formed by the first control housing part, the mortising, the stepped bushing, the stop element, and the closing element of the control valve.

BRIEF DESCRIPTION OF THE DRAWING

Further features, advantages and applications of the present invention will now be described in the following detailed description of one embodiment, made with reference to the accompanying drawing, in which.

DETAILED DESCRIPTION

Figure 1:
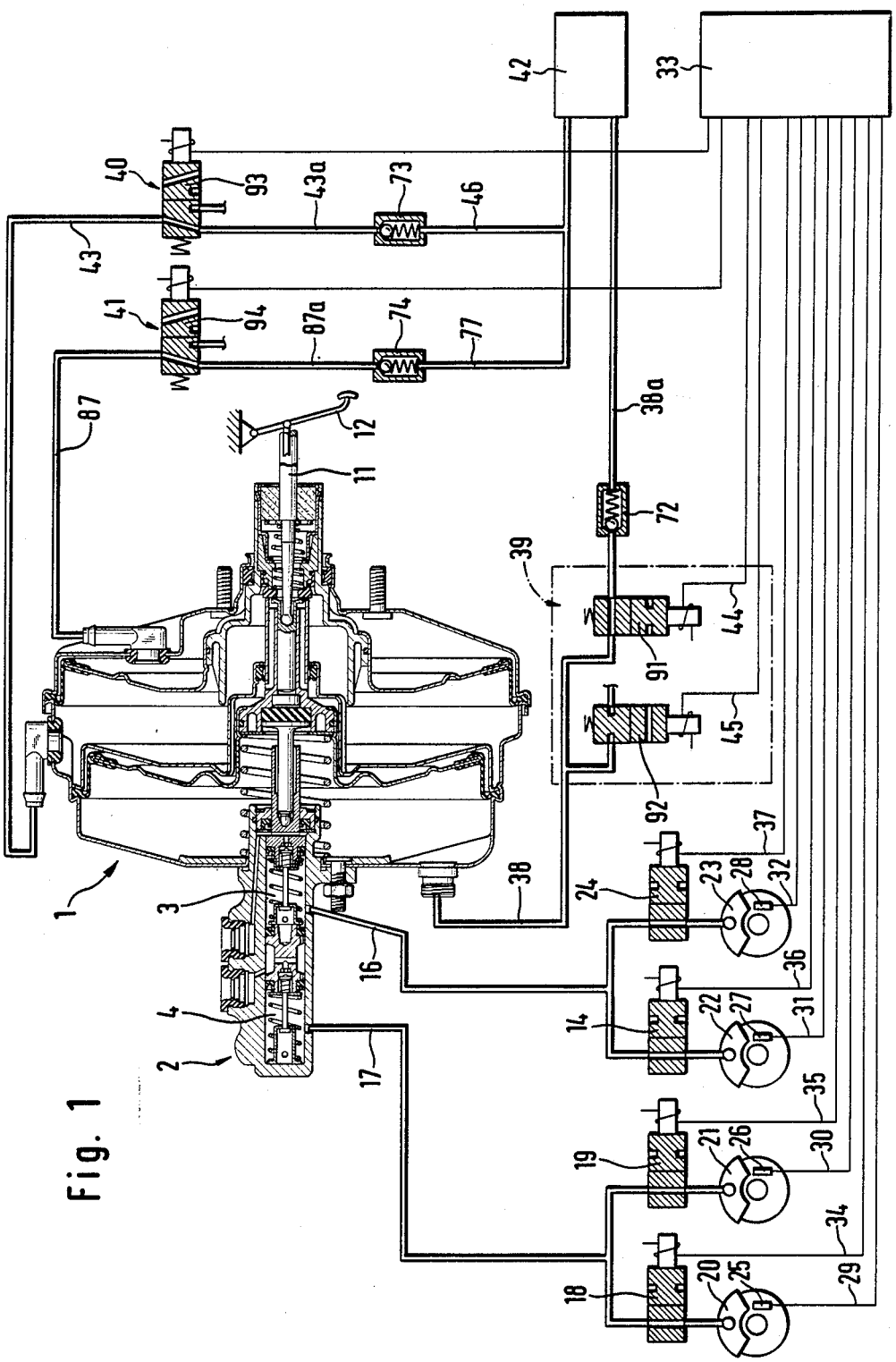
FIG. 1 shows a diagrammatic illustration of an automotive vehicle brake unit with a vacuum brake power booster according to the present invention; and, FIG. 2 shows a cross section through an embodiment of the vacuum brake power booster in accordance with the present invention.

FIG. 1 shows an automotive vehicle brake unit with anti-locking protection, comprised of a vacuum brake power booster 1 which is connected to a brake pedal 12 in a known manner through an input member or piston rod 11. On the side of the vacuum brake power booster 1 facing away from the piston rod 11, a tandem master brake cylinder 2 is provided which is in connection with a brake fluid reservoir (not shown). A first and a second brake circuit 16, 17 respectively are connected to the pressure chambers 3, 4 of the tandem master brake cylinder 2.

Through two solenoid valves 18, 19 in the form of 2/2-way valves, the second brake circuit 17 connects the wheel cylinders of the two wheel brakes 20, 21, respectively, shown only in a diagrammatic representation to the tandem master brake cylinder 2. In this configuration, each one of the two solenoid valves 18, 19 is associated to one of the two wheel brakes 20, 21, respectively The first brake circuit 16 connects the wheel cylinders of the further two wheel brakes 22, 23, which also are shown only diagrammatically in the drawing, to the tandem master brake cylinder 2 through two further solenoid valves 14, 24 which, again, are provided as 2/2-way valves.

With each of the front wheel brakes and rear wheel brakes 20, 21, 22, 23 a sensor 25, 26, 27, 28, respectively is associated which are connected to a central electronic control unit 33 through relevant signalling lines 29, 30, 31, 32, respectively. Sensors 25, 26, 27 and 28 which may, for example, be provided in the form of inductive transducers to monitor the rotating behavior of the wheels and furnish relevant signals over the signalling lines 29, 30, 31, 32 respectively, to the electronic control unit 33. Electronic control unit 33 is connected through control lines 34, 35, 36, 37 to the solenoid valves 18, 19, 14, 24, respectively in order to actuate the latter depending on the sensor signals.

Valve arrangements 39, 40, 41 whose function will be explained more fully hereinafter are connected to the vacuum brake power booster 1 through pneumatic lines 38, 43, 52a. In the example illustrated in the drawing, the first valve arrangement 39 is formed by two 2/2-way valves 91, 92 which are in connection with the electronic control unit 33 by means of control lines 44, 45. The 2/2-way valve 92 switching the atmosphere is preferably configurated in the shape of a solenoid valve, open when de-energized, while for the 2/2-way valve 91 switching the vacuum a solenoid valve, closed when de-energized is used whose inlet is connected to a vacuum source 42 through a non-return valve 72 by means of a line 38a. As an alternative, only one electromagnetically actuatable 3/2-way valve can be utilized.

In the example shown in the drawing, the second valve arrangement 40 is formed by an electromagnetically actuatable 3/2-way 93 which is connected through the pneumatic line 43 to the vacuum brake power booster 1 on one side and to the vacuum source 42 by means of a pneumatic line 43a containing a second non-return valve 73 on the other side and which is energizable by the electronic control unit 33 through a control line 46. Finally, the third valve arrangement 41, too, is comprised of an electromagnetically actuatable 3/2-way valve 94 which is in connection with the vacuum brake power booster 1 through a pneumatic line 87 and with the vacuum source 42 through another pneumatic line 87a, a third non-return valve 74 being interposed, while a further control line 77 takes care of its actuation. Obviously, instead of the two 3/2-way valves 93 and 94, 2/2-way valves may be used as an alternative, which are preferably to be employed in the form of a combination of a solenoid valve, open when de-energized with a solenoid valve, closed when de-energized.

Figure 2:
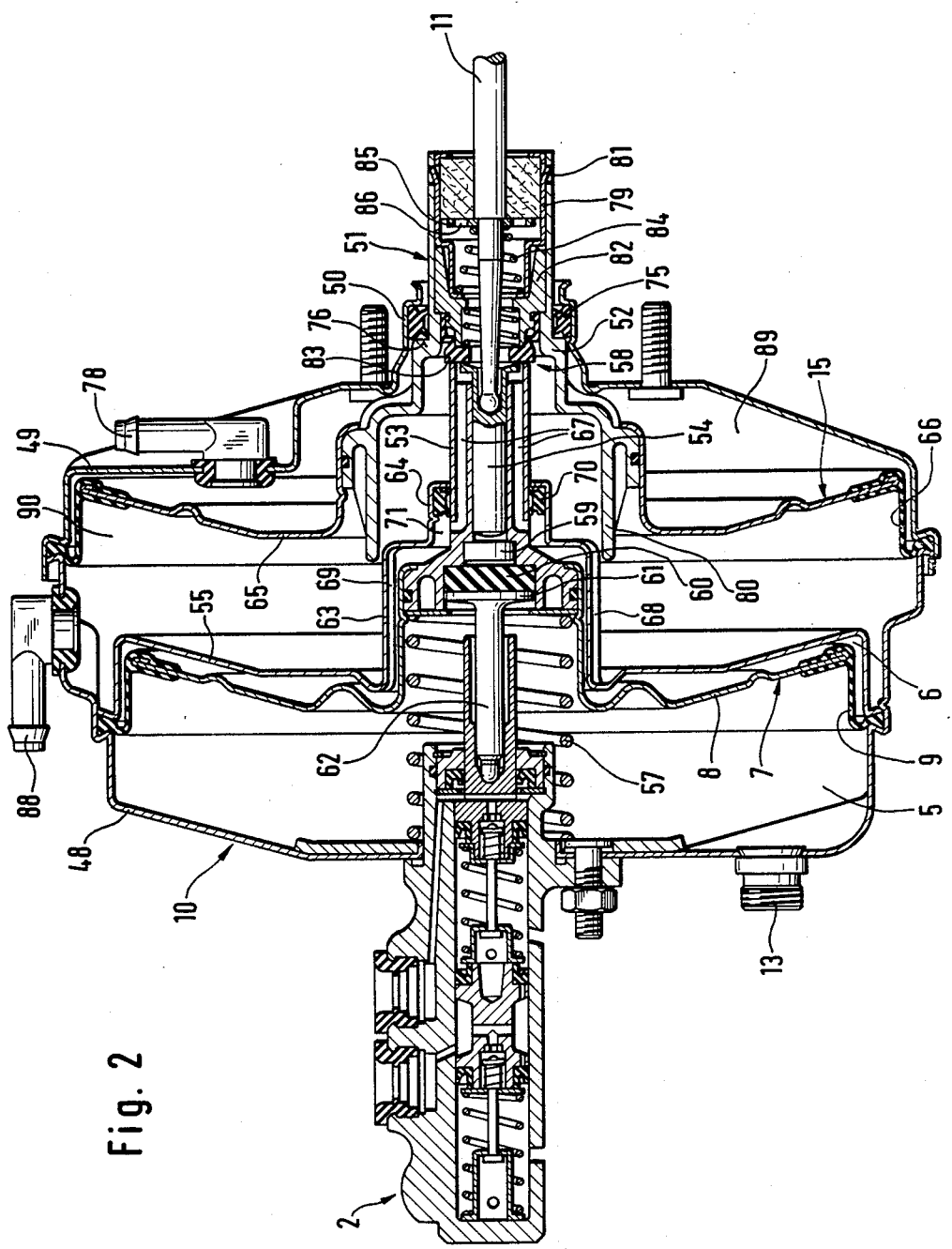

According to FIG. 2, the vacuum brake power booster 1 comprises two cup-shaped housing parts 48, 49 being assembled together with their open sides and constituting a booster housing 10. The left housing part 48 when viewed in FIG. 2 which is furnished with two pneumatic connections 13, 88 retains the tandem master brake cylinder 2, while the right housing part 49 which is furnished with a third pneumatic connection 78 presents a central guide socket 50 which slidingly retains a control valve housing 51 of the vacuum brake power booster 1 guiding it is a vacuum-tight manner. A partition wall 55 is provided in the booster housing 10 which in the internal space thereof divides a booster section from a modulator section.

The pneumatic connection 13 renders a connection between the vacuum source 42, the atmosphere and a first power chamber 5 which is arranged within the booster housing 10 and is separated from a second power chamber 6 by a first movable wall 7 being formed by a diaphragm disc 8 and a rolling diaphragm 9 secured to it and which is aeratable by means of a control valve arrangement 58 being accommodated in the control valve housing 51. In this configuration, control valve housing 51 consists of a first control housing part 52 and a second control housing part 53 which are arranged so as to be slidable relative to each other. This control valve arrangement 58 is actuated by a valve piston 54 which is connected to the piston rod 11 and which transmits the actuating power being introduced through the brake pedal 12, by way of a transmission disc 59, a high-elasticity material reaction disc 60, and a pressure plate 61 to a power output member or push rod 62. A return spring 57 taking support at the second control housing part 53 is provided to restore the first movable wall 7.

The internal space being defined between the right housing part 49 when viewing the drawing and the partition wall 55 is subdivided by a second movable wall 15 into two further pneumatic power chambers 89, 90 which form a brake power modulator utilized in the event of a slip control action. Second movable wall 15 is formed by a second diaphragm disc 65 against which a second rolling diaphragm 66 is abutted whose external circumference is secured between the two housing parts 48 and 49 and whose internal circumference is retained by the second diaphragm disc 65.

On its side facing the second pneumatic power chamber 90, the partition wall 55 is formed with an axial, centrally disposed cylindrical extension 63 which is furnished with radial fins 68, 69 arranged on the outside and on the inside and which passes over to a further axial extension 64 having a smaller diameter and jointly with the second control housing part 53 defining an annular chamber 71. Within annular chamber 71 a sealing ring 70 is arranged in which the second control housing part 53 is sealedly guided and which divides the annular chamber 71 from the internal space of a cylindrical guide 80 being arranged at the first control housing part 52 and guided on the axial extension 63. Air guide ducts 67 arranged in the second control housing part 53 end or terminate in annular chamber 71 which render it possible to aerate the power chamber 6 in the event of actuation of the control valve 58, respectively to evacuate it through the second pneumatic power chamber 90. An annular surface 76 is arranged at the first control housing part 52 which in the release position of the vacuum brake power booster is abutted against a sealing ring 75 accommodated in the guide socket 50, exactly positioning the brake pedal.

In order to transmit the power enacted by the second movable wall 15 to the second control housing part 53, in the event of a traction slip control action, and, thus, to the power output member or push rod 62, a stepped cylindrical bushing 79 is provided in the first control housing part 52 which is in a friction-type locking with it by means of a mortising 81. The end of bushing 79 facing the control valve 58 takes support at a top element 82 for the closing element 83 of the control valve 58, so that the foremensioned power transmission takes place by way of closing element 83.

The method of functioning of the automotive vehicle brake unit illustrated in the drawing will be described in the following: When the brakes are in the released condition, that is, as long as the vacuum brake power booster 1 is not actuated, all of the power chambers 5, 6, 89 and 90 thereof will be pressure-balanced and evacuated. While the two pneumatic power chambers 89 and 90 as well as the vacuum chamber 5 are directly connected to the vacuum source 42 through valves 94, 93 and 91, open when de-energized, evacuation of the aeratable power chamber 6 will take place through the second pneumatic power chamber 90 and through the air guide ducts 67 being arranged in the second control housing part 53. Due to the force of the return spring 57, the first movable wall 7 will come into abutment against the closing element 83, while the second movable wall 15 will abut against the sealing ring 75 through the annular surface 76 arranged at the first control housing part 52.

Now, when the brake pedal 12 is operated during braking, the power brought to bear will slide the piston rod 11 together with the valve piston 54 to the left, as a result of which the control valve arrangement 58 will be actuated. Consequently, a differential pressure being proportional to the foot effort will controlledly be introduced at the movable wall 7 which then generates a boosting power which is added to the pedal effort and will be transmitted through the push rod 62 directly to the pistons of the master brake cylinder 2 in order to build up a hydraulic pressure is the two pressure chambers 3 and 4 which will be conveyed through the brake circuits 16 and 17 to the individual wheel brakes 20, 21, 22 and 23. During the forward thrust motion of the control piston 54, the powerless second movable wall 15 will be slid. It is ensured in this manner that the elements which participate in the modulation of the brake pressure and in retaining the pedal force in the event of a control action will be moved along passively. The actuation and the release of the brakes therefore proceeds just as in known vacuum brake power boosters.

If and when in the course of a braking operation the locking of the associated wheel is detected by one or more of the sensors 25, 26, 27 28 and is signalled to the central electronic control unit 33, the latter will generate change-over signals which cause a change-over of the valve arrangement 39. The first power chamber 5 will be aerated, so that the boosting power enacted by the first movable wall 7 will be cancelled, and a power directed contrary to the input power may even originate. The input power controlledly introduced as yet (whose entity is assumed to be constant for reasons of simplicity) will so lift the sealing seat arranged on the control piston 54 off from the closing element 83, so that the aeratable power chamber 6 will fully be subjected to the atmospheric pressure In the event of a renewed build-up of the pressure prevailing in the master brake cylinder 2 as a result of an evacuation of the first power chamber 5, the maximum value of that pressure will be determined by the controlledly introduced input power, since in the event of a higher differential pressure acting on the first movable wall 7, the sealing seat configurated at the second control housing part 53 will be opened up. As a result thereof a connection between the aeratable second power chamber 6 and the second pneumatic power chamber 90 will be established, so that the partial braking position determined by the input power will be stabilized. For the purpose of modulation of the pressure in the brake circuits 16, 17 the first power chamber 5 will alternately be subjected to vacuum and to the atmosphere, respectively through the first valve arrangement 39, in which context the use of the two distance 2/2-way valves 91, 92 will realize a pressure keeping phase in the brake pressure modulator section.

When it is necessary to reduce the pressure existing in the master brake cylinder 2 down to zero, the second pneumatic power chamber 90 is aerated by switching-over of the second valve arrangement 40, of the 3/2-way valve 93. As a result, a retaining power directed contrary to the input power will be built up at the second movable wall, which retaining power will be transmitted to the piston rod 11 through the first control housing part 52, the stepped bushing 79, a compression spring 84 taking support at the said bushing 79, and a disc 85 furnished with axial openings 86 and secured to the input member or piston rod 11, through a direct support taken by the bushing 79 at the disc 85. When the anti-locking control action has ended, the first power chamber 5 will be completely evacuated and the first valve arrangement 39 will be switched back. Thus, the assembly as a whole will return to the condition existing before the control action. Now the braking operation can be continued in the normal way or be terminated by finishing the foot effort.

If and when a spinning of one or more of the driving wheels is detected by one or more of the sensors 25, 26, 27, 28, a traction slip control action will have to be initiated. As to pressure, the brake cylinders of the non-driven wheels will be separated from the brake power booster-and-master cylinder assembly by means of the solenoid valves 18, 19, 14, 24. Thereupon, the first pneumatic power chamber 89 will be aerated by switching-over of the third valve arrangement 41.

The differential pressure of the two pneumatic power chambers 89, 90 which is built up will generate a power at the second movable wall 15 which will actuate the pistons of the master brake cylinder 2 through the first control housing part 52, the mortising 81, the stop element 82, the closing element 83, the control piston 54, the second control housing part 53, the transmission disc 59, the reaction disc 60, and the power output member 62 and will, thus, build up a pressure proportional to the said power in the pressure chambers 3, 4 of the master brake cylinder under the effect of which the driven wheels will be braked. In regard to the hydraulic separation of the non-driven wheels from the master brake cylinder 2, this auxiliary pressure cannot have any effect in their brake cylinders. A renewed foot effort, that is, braking with controlled introduction of the foot effort during the traction slip control action will be possible at anytime without interruption.

What is claimed is:

1. A vacuum brake power booster for a slip-controlled hydraulic brake unit, with at least two power chambers separated from each other by a first movable wall within a booster housing, one of which being connectable either to a vacuum source or to the atmosphere and the other one, for the purpose of generating a boosting power which is proportional to an input power introduced at a brake pedal, being aeratable through a control valve which is actuatable by means of the brake pedal and whose control valve housing is comprised of two control housing parts being slidable relative to each other, the first control housing part being abutted against a stationary stop and the second control housing part bearing the first movable wall, guiding a control valve piston which is connected to the brake pedal by means of an input member and interacting with a power output member, and with a second movable wall which is subjectable to a controllable differential pressure and which separates a first pneumatic power chamber being connected to the vacuum source in the release position from a second pneumatic power chamber being subjectable to the atmosphere and to vacuum respectively, wherein said first movable wall (7) is movable independently of the said input member (11) and wherein said second movable wall (15) is provided at said first control housing part (52).

2. A vacuum brake power booster as claimed in claim 1, wherein said first movable wall (7) is axially guided within a first cylindrical extension (63) of a partition wall (55) which is arranged in said booster housing (10) and which separates said second pneumatic power chamber (90) from the said power chamber (6) being aeratable by means of the said control valve (58).

3. A vacuum brake power booster as claimed in claim 2, wherein said cylindrical extension (63) passes over to a second cylindrical extension (64) having a smaller diameter within which said second control housing part (53) is sealedly guided.

4. A vacuum brake power booster as claimed in claim 3, wherein said second control housing part (53), axially extending air guide ducts (67) are provided which end up in tan annular chamber (71) being defined by said second axial extension (64) and in connection with said aeratable power chamber (6).

5. A vacuum brake power booster as claimed in claim 4, wherein said first control housing part (52) is provided with a cylindrical guide (80) which is guided on said first extension (63) of said partition wall (55).

6. A vacuum brake power booster as claimed in claim 5, wherein a rolling diaphragm (9) forming the radially external margin of said first movable wall (7) is clamped between a first booster housing half (48) and said partition wall (55).

7. A vacuum brake power booster as claimed in claim 5, wherein said first cylindrical extension (63) of said partition wall (55) is furnished with axially extending radial fins (68, 69) being disposed both on the outside and on the inside.

8. A vacuum brake power booster as claimed in claim 5, wherein said first control housing part (52) is formed with an annular surface (76) which in the release position is abutted against a sealing ring (75) sealing off said booster housing (10) toward the outside.

9. A vacuum brake power booster as claimed in claim 8, wherein said second movable wall (15) is in power transmitting connection with said input member (11).

10. A vacuum brake power booster as claimed in claim 9, wherein said power transmitting connection is formed by a stepped cylindrical bushing (79) which is in a friction-type locking with said first control housing part (52) and at which a compression spring (84) takes support whose other end is abutted against a disc (85) being secured to said input member (11).

11. A vacuum brake power booster as claimed in claim 10, wherein said friction-type locking between said first control housing part (52) and said stepped bushing (79) is formed by a mortising (81).

12. A vacuum brake power booster as claimed in claim 10, in the event of a compression of the said compression spring (84), a direct transmission of power takes place between said stepped bushing (79) and said disc (85).

13. A vacuum brake power booster as claimed in claim 12, wherein said disc is furnished with axial openings (86).

14. A vacuum brake power booster as claimed in claim 13, wherein said first pneumatic power chamber (89) is connectable to the atmosphere and in that means (52, 79, 81, 83) are provided which transmit the power enacted by said second movable wall (15) to said second control housing part (53).

15. A vacuum brake power booster as claimed in claim 14, wherein said means are formed by said first control housing part (52), by said mortising (81), by said stepped bushing (79), by said stop element (82) and by the closing element (83) of said control valve (58).

16. A vacuum brake power booster as claimed in claim 14, wherein connection of said first power chamber (89) with the atmosphere is realized by means of an electromagnetically actuatable 3/2-way valve (94)

* * * * *